(12) United States Patent
Uemura et al.

(10) Patent No.: US 10,975,953 B2
(45) Date of Patent: Apr. 13, 2021

(54) OIL CIRCULATION DEVICE AND OIL CIRCULATION SYSTEM FOR AGITATING OIL IN OIL BATH

(71) Applicant: FANUC CORPORATION, Yamanashi (JP)

(72) Inventors: Norimitsu Uemura, Yamanashi (JP); Masaaki Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 163 days.

(21) Appl. No.: 16/200,647

(22) Filed: Nov. 27, 2018

(65) Prior Publication Data

US 2019/0195333 A1 Jun. 27, 2019

(30) Foreign Application Priority Data

Dec. 25, 2017 (JP) .............................. JP2017-247916

(51) Int. Cl.
  *F16H 57/04* (2010.01)
  *B25J 17/02* (2006.01)
  *B01F 5/10* (2006.01)

(52) U.S. Cl.
  CPC ......... *F16H 57/0404* (2013.01); *B01F 5/102* (2013.01); *B01F 5/106* (2013.01);
  (Continued)

(58) Field of Classification Search
  CPC ............. F16H 57/0404; F16H 57/0441; F16H 57/0405; B25J 17/02; B25J 19/0062; B25J 17/00; B01D 35/02; B01F 5/10; B01F 5/102; B01F 5/104; B01F 5/106; B01F 5/108; B01F 15/0437
  (Continued)

(56) References Cited

U.S. PATENT DOCUMENTS

| 2,900,176 A | * | 8/1959 | Krogel | .................. | D21H 21/28 366/137 |
| 3,784,092 A | * | 1/1974 | Gibson | .................. | B04B 5/005 494/2 |

(Continued)

FOREIGN PATENT DOCUMENTS

| GB | 607638 A | * | 9/1948 | ...... C10M 175/0091 |
| JP | S54-86065 A | | 7/1979 | |

(Continued)

*Primary Examiner* — Charles Cooley
(74) *Attorney, Agent, or Firm* — Hauptman Ham, LLP

(57) ABSTRACT

A control unit has as agitation mode in which a command is executed for a first switching valve so that the oil supply/discharge direction is switched so as to supply oil to a first oil supply/discharge port located at a low position and discharge oil from a second oil supply/discharge port located at a high position, whereby oil in an oil bath is agitated via a circulation pump from a low position to a high position is the oil bath; and a filter mode in which, after the agitation mode is executed, a command is executed for the first switching valve so that the oil supply/discharge direction is switched so as to discharge oil from the first oil supply/discharge port located at a low position and supply oil to the second oil supply/discharge port located in a high position, whereby impurities in the oil sent to a filter mechanism are filtered.

10 Claims, 9 Drawing Sheets

(52) U.S. Cl.
CPC .......... *B25J 17/02* (2013.01); *F16H 57/0405* (2013.01); *F16H 57/0441* (2013.01)

(58) Field of Classification Search
USPC .................................................. 366/136–137
See application file for complete search history.

(56) References Cited

U.S. PATENT DOCUMENTS

| | | | | |
|---|---|---|---|---|
| 3,791,576 | A * | 2/1974 | Bazil | B04B 9/06 123/41.55 |
| 3,830,473 | A * | 8/1974 | Lieferman | C08B 30/16 366/136 |
| 4,366,069 | A * | 12/1982 | Dudrey | B04B 1/08 210/138 |
| 4,773,992 | A * | 9/1988 | Dietrick | B04B 1/14 210/112 |
| 6,039,470 | A * | 3/2000 | Conwell | B01F 5/10 366/137 |
| 6,146,008 | A * | 11/2000 | Laederich | B01J 19/0006 366/136 |
| 6,322,694 | B1 * | 11/2001 | Iliadis | B01D 17/0208 210/167.01 |
| 6,702,729 | B2 * | 3/2004 | Mazzuca | B04B 5/005 494/26 |
| 7,407,474 | B2 * | 8/2008 | Smith | B01D 17/005 494/49 |
| 7,906,011 | B2 * | 3/2011 | Burris | C10C 3/04 106/273.1 |
| 8,297,830 | B2 * | 10/2012 | Tseng | B24B 37/04 366/136 |
| 2002/0142910 | A1 * | 10/2002 | Mazzuca | B04B 11/02 494/49 |
| 2006/0003882 | A1 * | 1/2006 | Smith | B01D 17/10 494/49 |
| 2016/0304805 | A1 * | 10/2016 | Wase | B01D 21/01 |
| 2019/0195333 | A1 * | 6/2019 | Uemura | B25J 19/0062 |

FOREIGN PATENT DOCUMENTS

| | | |
|---|---|---|
| JP | S60-48271 A | 3/1985 |
| JP | H7-284743 A | 10/1995 |
| JP | H8-150303 A | 6/1996 |
| JP | H11-169917 A | 6/1999 |
| JP | 2003-303113 A | 10/2003 |
| JP | 2006-307776 A | 11/2006 |

* cited by examiner

OIL CIRCULATION DEVICE AND OIL CIRCULATION SYSTEM FOR AGITATING OIL IN OIL BATH

RELATED APPLICATIONS

The present application claims priority of Japanese Patent Application No. 2017-247916, filed on Dec. 25, 2017, the disclosure of which is hereby incorporated by reference herein in its entirety.

BACKGROUND OF THE INVENTION

1. Field of the Invention

The present invention relates to an oil circulation technology, and more particularly to an oil circulation device and an oil circulation system for agitating oil in an oil bath.

2. Description of the Related Art

Reduction gears for reducing the rotational speed of motors serving as power sources and obtaining the necessary torque are arranged on the joint axes of robots. When an oil bath system for lubricating each reduction gear is adopted, although the life of the oil itself is prolonged thereby, impurities such as metal powder and sludge are generated due to deterioration of bearings or the like in the reduction gear, and accordingly, it is necessary to regularly exchange and discard the oil. Further, the amount of iron powder contained in the oil has been measured as the criteria for determining the deterioration of the reduction gear or the like.

As a background art related to the present application, for example, the following patent documents are publicly known. Japanese Unexamined Patent Publication (Kokai) No. 2006-307776 discloses a cleaning apparatus for cleaning an oil circulation path of a relatively large engine or the like used as a power source for a heavy machine, a construction machine, a small boat, a car, etc. In such a cleaning apparatus, impurities such as sludge or metal powder are removed by a filter arranged in the oil circulation path.

Japanese Unexamined Patent Publication (Kokai) No. 08-150303 discloses an oil regeneration treatment apparatus capable of removing impurities in oil and regenerating the oil so that the oil can be reused. Such an oil regeneration treatment apparatus is provided with a stirring/reaction layer which adds a separating agent to the impurity-containing oil and agitates the oil, so that precipitation occurs due to ion reaction.

Japanese Unexamined Patent Publication (Kokai) No. 07-284743 discloses an oil flushing device for hydraulic oil pipelines. Such an oil flushing device includes an electromagnetic-type foreign substance collection oil tank having an automatic temperature control heater and an electromagnetic-type iron powder separation device for adsorbing the iron powder in the oil and discharging the iron powder.

Japanese Unexamined Patent Publication (Kokai) No. 11-169917 discloses a rolling coolant oil purification device for removing foreign substances such as iron powder or scum in coolant oil in a coolant oil circulation path of a cold rolling mill. Such a rolling coolant oil purification device is provided with a multistage iron powder separating device utilizing centrifugal force.

SUMMARY OF THE INVENTION

Reduction gears have a complicated internal shape by which metal powder generated by wear can easily become caught in a gap therein. In the joint axis on the wrist side of a robot, oil in an oil bath is agitated by the operation of the robot, and accordingly, metal powder tends to be easily discharged from the gap therein. However, as time elapses, metal powder having large specific gravity tends to precipitates in the oil bath. In the joint axis on the body side of the robot, even when the robot operates, the reduction gear oscillates only slightly or not at all. Thus, the oil in the oil bath tends not to be agitated, and accordingly, the metal powder tends to become caught in the gap therein or to remain to precipitate with the passage of time. Thus, even if the oil is exchanged, sufficient purification cannot be obtained.

Further, in the measurement of the amount of iron powder, which is performed to determine the deterioration of the reduction gear or the like, iron powder having large specific gravity tends to precipitate in the oil bath, and accordingly, it is difficult to collect a uniform sample as compared with grease lubrication-type reduction gears. In addition, when the robot is operated to agitate the oil in the oil bath, a qualified person who can operate the robot is necessary, and accordingly, it is not easy to exchange oil or measure the amount of iron powder.

Thus, a technology for agitating the oil in an oil bath by a simple method to improve the accuracy of measurement of impurities or the purification caused by oil exchange has been demanded.

An embodiment of this disclosure provides an oil circulation device for agitating oil in an oil bath. The oil circulation device includes an oil bath having a first oil supply/discharge port and a second oil supply/discharge port, a circulation pump for circulating the oil, a pair of pipes for connecting the oil bath and the circulation pump, a first switching valve which is attached to the pipes so as to switch the oil supply/discharge direction for each of the first oil supply/discharge port and the second oil supply/discharge port, a filter mechanism which is located upstream of the circulation pump so as to filter impurities in the oil, and a control unit for controlling at least the circulation pump and the first switching valve. The control unit has an agitation mode in which a command is executed for the first switching valve so that the oil supply/discharge direction is switched so as to supply oil to the first oil supply/discharge port located at a low position and discharge oil from the second oil supply/discharge port located at a high position, whereby oil in the oil bath is agitated via the circulation pump from a low position to a high position in the oil bath; and a filter mode in which, after the agitation mode is executed so as to suspend impurities in the oil bath, a command is executed for the first switching valve so that the oil supply/discharge direction is switched so as to discharge oil from the first oil supply/discharge port located at a low position and supply oil to the second oil supply/discharge port located in a high position, whereby impurities in the oil sent to the filter mechanism by the circulation pump are filtered.

Another embodiment of this disclosure provides an oil circulation device for agitating oil in an oil bath. The oil circulation device includes an oil bath having a first oil supply/discharge port and a second oil supply/discharge port, a circulation pump for circulating the oil, a pair of pipes for connecting the oil bath and the circulation pump, a first switching valve which is attached to the pipes so as to switch the oil supply/discharge direction for each of the first oil supply/discharge port and the second oil supply/discharge port, an oil collection tank which is located downstream of the circulation pump so as to collect oil, a new oil tank which is located upstream of the circulation pump so as to receive new oil, and a control unit for controlling at least the circulation pump and the first switching valve. The control unit has an agitation mode in which a command is executed for the first switching valve so that the oil supply/discharge direction is switched so as to supply oil to the first oil supply/discharge port located at a low position and discharge oil from the second oil supply/discharge port located at a high position, whereby oil in the oil bath is agitated via the circulation pump from a low position to a high position in the oil bath, and an oil exchange mode in which, after the agitation mode is executed so as to suspend impurities in the oil bath, a command is executed for the first switching valve so that the oil supply/discharge direction is switched so as to discharge oil from the first oil supply/discharge port located at a low position, whereby the oil is collected from the oil bath to the oil collection tank via the circulation pump, and a command is executed for the first switching valve so that the oil supply/discharge direction is switched so as to supply oil to the first oil supply/discharge port located at a low position, whereby the new oil is supplied from the new oil tank to the oil bath via the circulation pump.

DETAILED DESCRIPTION

Figure 1:
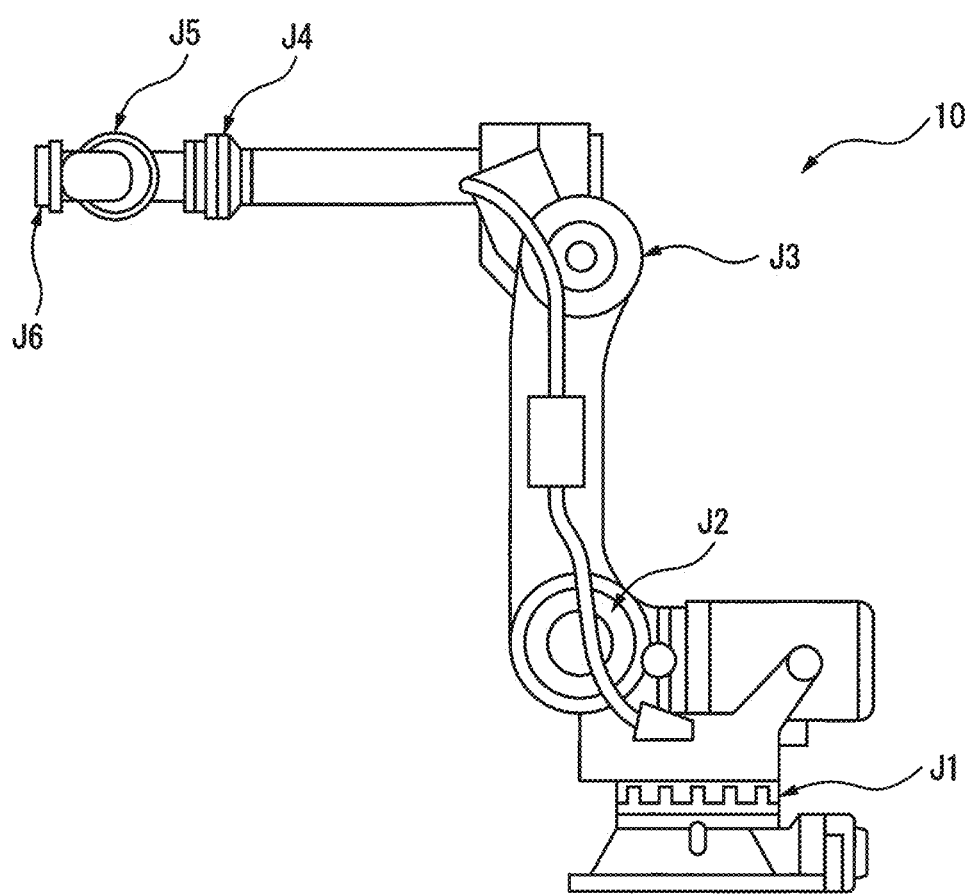
FIG. 1 is a side view showing a configuration of a robot in an embodiment.

Embodiments of the present disclosure will be described below in detail with reference to the accompanying drawings. In the drawings, the same or similar reference numerals are given to the same or similar components. Further, the embodiments described below do not limit the technical scope of the invention and the meaning of the terms described in the claims.

FIG. 1 is a side view showing a configuration of a robot 10 in an embodiment. The robot 10 is a known six-axis manipulator and has joint axes of a first axis J1 to a sixth axis J6, including at least a reduction gear and an oil bath.

Figure 2A:
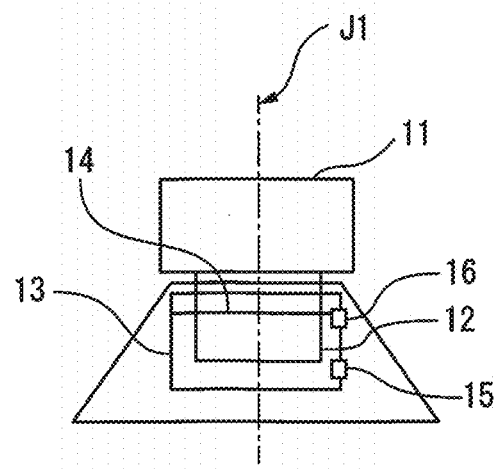
FIG. 2A is a schematic view showing an arrangement of a reduction gear and an oil bath in a first axis.

FIG. 2A is a schematic view showing an arrangement of a reduction gear 12 and an oil bath 13 in the first axis J1. In the first axis J1, the reduction gear 12 is connected to a robot base 11, and is immersed in oil 14 in the oil bath 13. The first axis J1 is a joint axis on the body side of the robot 10, and accordingly, even when the robot base 11 rotates around the first axis J1, the oil 14 in the oil bath 13 is only slightly agitated. Thus, impurities within the oil bath 13 can become caught in a gap of the reduction gear 12 or precipitated in the oil bath 13. The oil bath 13 has a first oil supply/discharge port 15 at a low position and a second oil supply/discharge port 16 at a high position. In an oil circulation device, which will be described later, a pair of pipes are connected to the first oil supply/discharge port 15 and the second oil supply/discharge port 16 so as to agitate the oil 14 in the oil bath 13 via a circulation pump (agitation mode), and thereafter, impurities are filtered by the circulation pump (filter mode) or the oil is exchanged (oil exchange mode).

Figure 2B:
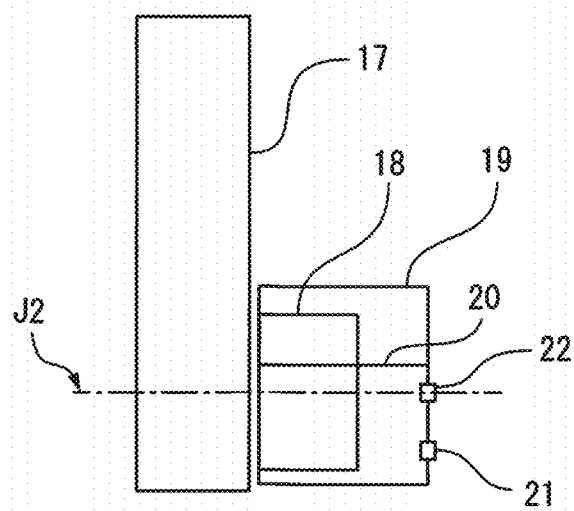
FIG. 2B is a schematic view showing an arrangement of a reduction gear and an oil bath in a second axis.

FIG. 2B is a schematic view showing the arrangement of a reduction gear 18 and an oil bath 19 in the second axis J2. In the second axis J2, the reduction gear 18 is connected to a robot arm 17, and immersed in oil 20 in the oil bath 19. The second axis J2 is also a joint axis on the body side of the robot 10, and accordingly, even when the robot arm 17 rotates around the second axis J2, the oil 20 in the oil bath 19 is only slightly agitated. The oil 20 in the oil bath 19 can be slightly agitated by the rotation of the robot base 11 around the first axis J1. However, this agitation is not sufficient to suspend the impurities in the oil bath 19. The oil bath 19 has a first oil supply/discharge port 21 at a low position and a second oil supply/discharge port 22 at a high position. In an oil circulation device, which will be described later, a pair of pipes are connected to the first oil supply/discharge port 21 and the second oil supply/discharge port 22, so as to execute the agitation mode via the circulation pump, and thereafter, the filter mode or the oil exchange mode is executed by the circulation pump.

The arrangement of the reduction gears and the oil baths in the third axis J3 to the sixth axis J6 is not illustrated, but is the same as that in the second axis J2. The third axis J3 to the sixth axis J6 are joint axes on the wrist joint side of the robot 10 or axes close to the joints, and accordingly, it is possible to agitate the oil in the oil bath by operating the joint axes closer to the body side than the third axis J3 to the sixth axis J6. However, after a certain period of time elapses after the operation of the robot 10 is stopped, impurities precipitate in the oil bath. Thus, in the oil circulation device, which will be described later, as in the first axis J1 and the second axis J2, a pair of pipes are connected to the first oil supply/discharge port and the second oil supply/discharge port of the oil bath in each of the third axis J3 to the sixth axis J6, and, after the agitation mode is executed via the circulation pump, the filter mode or the oil exchange mode is executed.

FIGS. 3A to 3D are schematic views showing components of the oil circulation device according to the first embodiment. The components of the oil circulation device are provided as a composable kit and are individually removable, and accordingly, are portable. The user can assemble the oil circulation device by appropriately combining the components shown in FIGS. 3A to 3D in accordance with the task (i.e., the agitation mode, the filter mode, or the oil exchange mode). Note that the oil circulation device to be described later is not only applied to the reduction gear of the robot but may be applied to other targets to be lubricated.

Figure 3A:
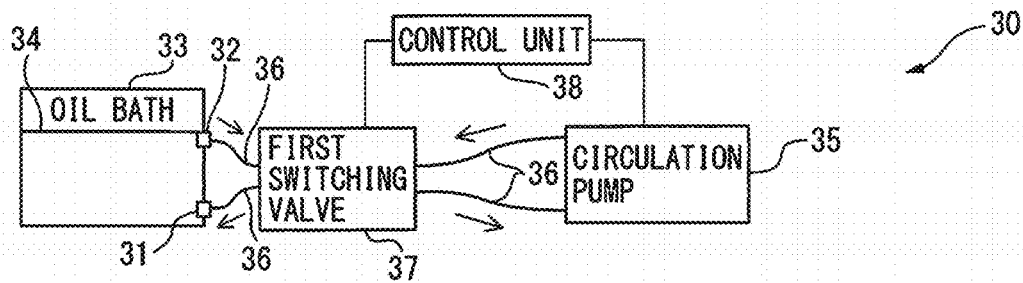
FIG. 3A is a schematic view showing components of an oil circulation device according to a first embodiment.

FIG. 3A is a schematic, view showing components of an it circulation device 30 in the agitation mode. The oil circulation device 30 includes an oil bath 33 having a first oil supply/discharge port 31 and a second oil supply/discharge port 32, a circulation pump 35 for circulating the oil 34, a pair of pipes 36 for connecting the oil bath 33 and the circulation pump 35, and a first switching valve 37, which is attached to the pipes 36 so as to switch the direction of supply and discharge of the oil to and from the first oil supply/discharge port 31 and the second oil supply/discharge port 32. The circulation pump 35 and the first switching valve 37 may be controlled manually. However, the oil circulation device 30 may further include a control unit 38 for controlling at least the circulation pump 35 and the first switching valve 37. The control unit 38 is comprised of a known CPU or ASIC, or an FPGA.

In the agitation mode, the control unit 38 executes a command for the first switching valve 37 so that the oil supply/discharge direction is switched so as to supply the oil to the first oil supply/discharge port 31 located at a low position and discharge the oil from the second oil supply/discharge port 32 located at a high position, and thus, the oil 34 in the oil bath 33 is agitated from a low position to a high position in the oil bath 33 via the circulation pump 35. Thus, impurities in the oil bath 33 can be suspended. After the agitation mode is executed so as to suspend the impurities in the oil bath 33, sample oil may be taken out directly from the oil bath 33, and the concentration of metal powder in the impurities may be measured.

Figure 3B:
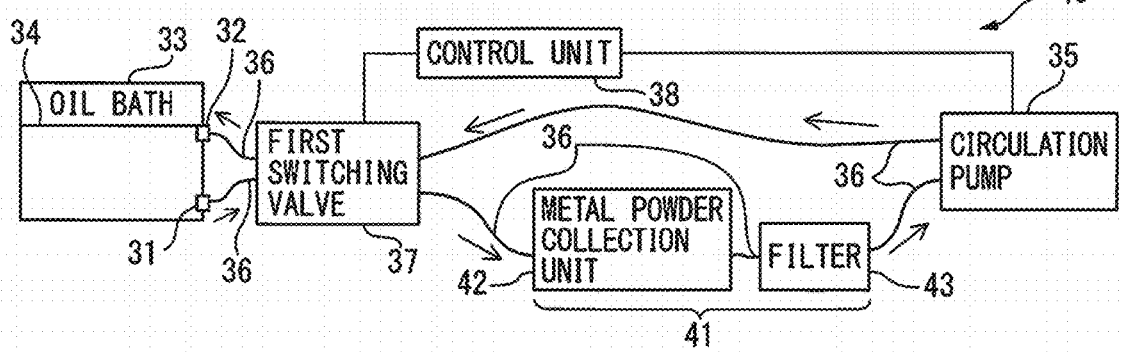
FIG. 3B is a schematic view showing components of the oil circulation device according to the first embodiment.

FIG. 3B is a schematic view showing components of an oil circulation device 40 in the filter mode. The oil circulation device 40 further includes a filter mechanism 41, which is located upstream of the circulation pump 35 and filters impurities in the oil, as compared with the oil circulation device 30 in the agitation mode. The impurities include metal powder and sludge, and the filter mechanism 41 includes a metal powder collection unit 42 for collecting metal powder in the oil and a filter 43 for filtering sludge, i.e., the remaining impurities.

After the agitation mode is executed so as to suspend the impurities in the oil bath 33, in the filter mode, the control unit 38 executes a command for the first switching valve 37 so that the oil supply/discharge direction is switched so as to discharge the oil 43 from the first oil supply/discharge port 31 located at a low position and supply the oil to the second oil supply/discharge port 32 at a high position, and thus, impurities in the oil sent to the filter mechanism 41 by the circulation pump 35 are filtered. The filter mode is executed after the impurities in the oil bath 33 are suspended, and accordingly, the impurities tend not to remain in the oil bath 33, whereby the accuracy of measurement of the metal powder in the impurities can be improved.

Figure 3C:
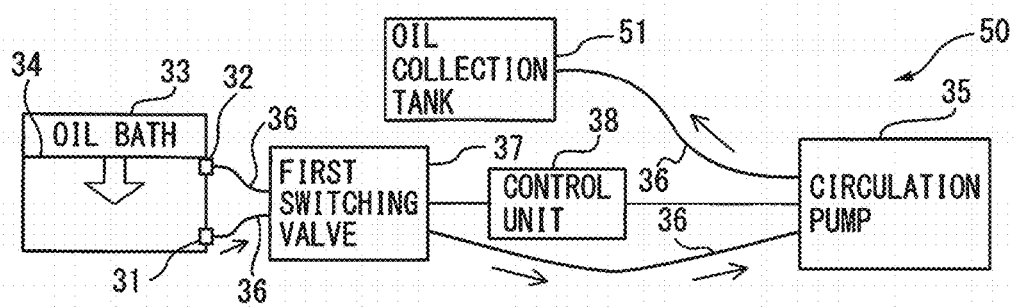
FIG. 3C is a schematic view showing components of the oil circulation device according to the first embodiment.

FIG. 3C is a schematic view showing components of an oil circulation device 50 in a collecting operation in the oil exchange mode. The oil circulation device 50 further includes an oil collection tank 51 disposed downstream of the circulation pump 35, as compared with the oil circulation device 30 in the agitation mode. After the agitation mode is executed so as to suspend the impurities in the oil bath 33, in the collecting operation, the control unit 38 executes a command for the first switching valve 37 so that the oil supply/discharge direction is switched so as to discharge the oil from the first oil supply/discharge port 31 located at the low position, and thus, the oil 34 is collected from the oil bath 33 to the oil collection tank 51 via the circulation pump 35. The collection operation is performed after impurities in the oil bath 33 are suspended, and accordingly, the impurities tend not to remain in the oil bath 33, whereby the purification action by oil exchange can be improved.

Figure 3D:
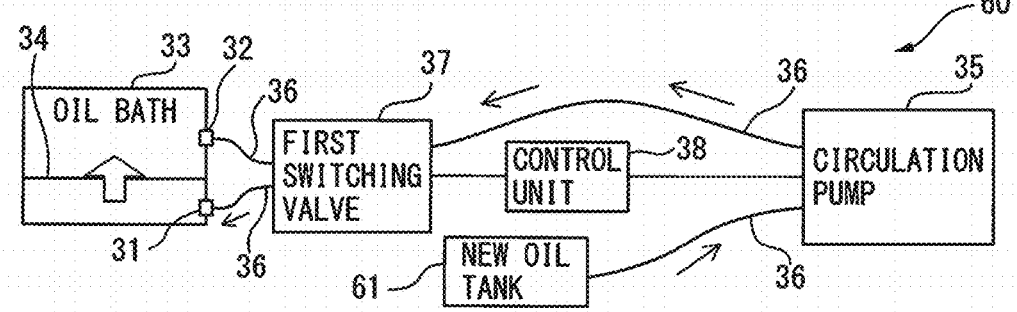
FIG. 3D is a schematic view showing components of the oil circulation device according to the first embodiment.

FIG. 3D is a schematic, view showing components of an oil circulation device 60 in an oil supply operation in the oil exchange mode. The oil circulation device 60 further includes a new oil tank 61 located upstream of the circulation pump 35, as compared with the oil circulation device 30 in the agitation mode. After the oil is collected, in the oil supply operation, the control unit 38 controls the first switching valve 37 so that the oil supply/discharge direction is switched so as to supply the oil to the first oil supply/discharge port 31 located at the low position, and thus, new oil is supplied from the new oil tank 61 to the oil bath 33 via the circulation pump 35.

Figure 4A:
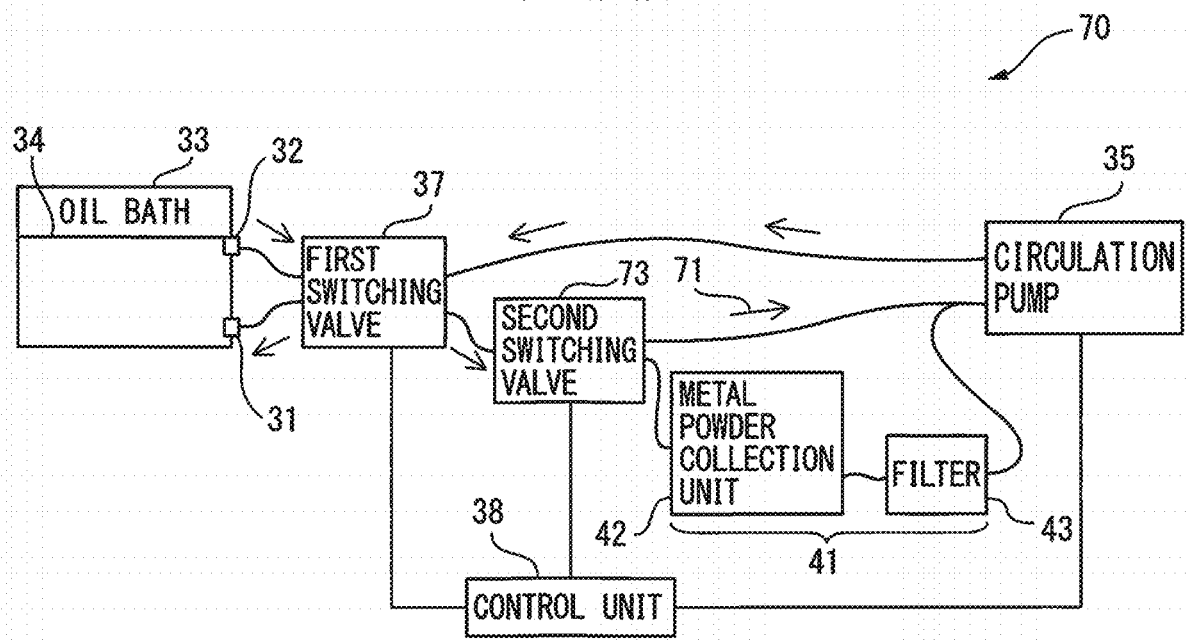
FIG. 4A is a schematic view showing components of an oil circulation device according to a second embodiment in which an agitation mode and a filter mode are combined.
Figure 4B:
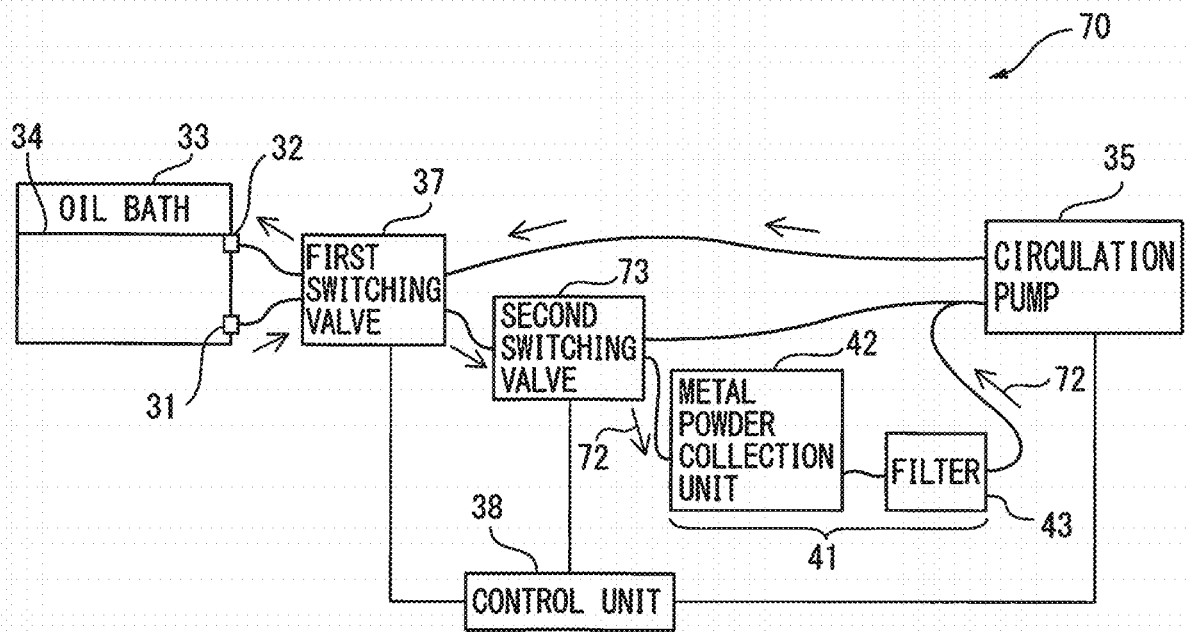
FIG. 4B is a schematic view showing components of the oil circulation device according to the second embodiment in which the agitation mode and the filter mode are combined.

FIGS. 4A and 4B are schematic views showing components of an oil circulation device 70 according to the second embodiment in which the agitation mode and the filter mode are combined. As compared with the oil circulation device 40 shown in FIG. 3B, the oil circulation device 70 further includes a second switching valve 73 which is located upstream of the filter mechanism 41 so as to switch the path between a path 71 (see FIG. 4A) in the agitation mode and a path 72 (see FIG. 4B) in the filter mode.

As shown in FIG. 4A, in the agitation mode, the control unit 38 executes a command for the first switching valve 37 so that the oil supply/discharge direction is switched so as to supply the oil 34 to the first oil supply/discharge port 31 located at the low position and discharge the oil from the second supply/discharge port 32 located at the high position, and executes a command for the second switching valve 73 so that the path is switched to the path 71 in the agitation mode, and thus, the oil 34 in the oil bath 33 is agitated from the low position to the high position in the oil bath 33 via the circulation pump 35. As a result, impurities in the oil bath 33 can be suspended.

As shown in FIG. 1B, in the filter mode, after executing the agitation mode so as to suspend impurities in the oil bath 33, the control unit 38 executes a command for the first switch ting valve 37 so that the oil supply/discharge direction is switched so as to discharge the oil 34 from the first oil supply/discharge port 31 located at the low position, and supply the oil to the second supply/discharge port 32 located at the high position, and executes a command for the second switching valve 73 to that the path is switched to the path 72 in the filter mode, and thus, the impurities in the oil 34 sent to the filter mechanism 41 by the circulation pump 35 are filtered. The oil circulation device 70 includes the second switching valve 73, so that the agitation mode and the filter mode can be automatically switched and executed.

Figure 4C:
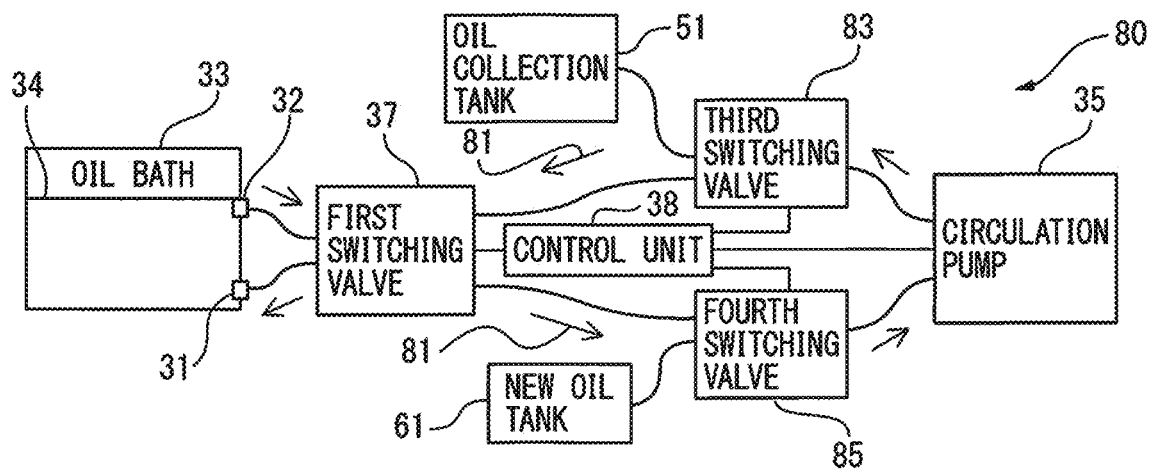
FIG. 4C is a schematic view showing components of an oil circulation device according to a third embodiment in which an agitation mode and an oil exchange mode are combined.
Figure 4D:
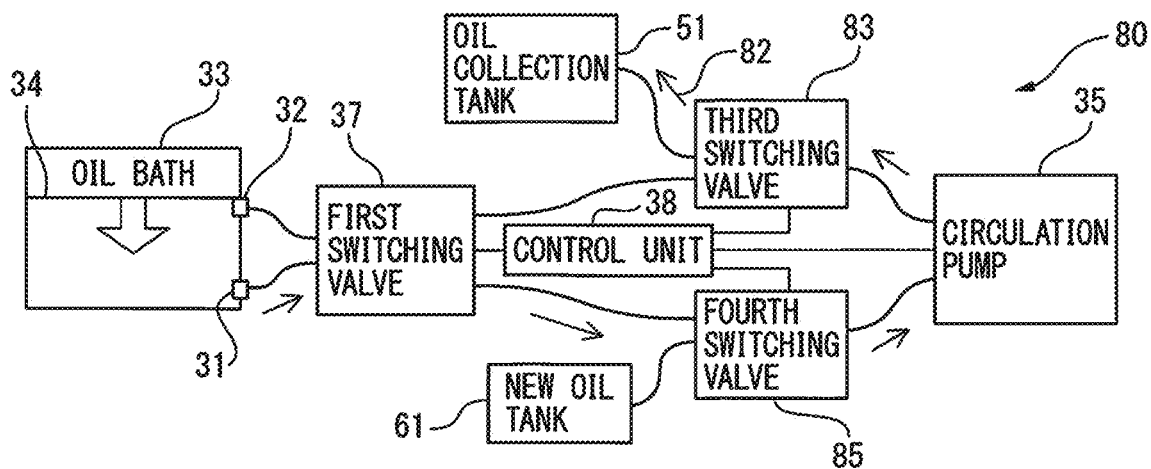
FIG. 4D is a schematic view showing components of the oil circulation device according to the third embodiment in which the agitation mode and the oil exchange mode are combined.
Figure 4E:
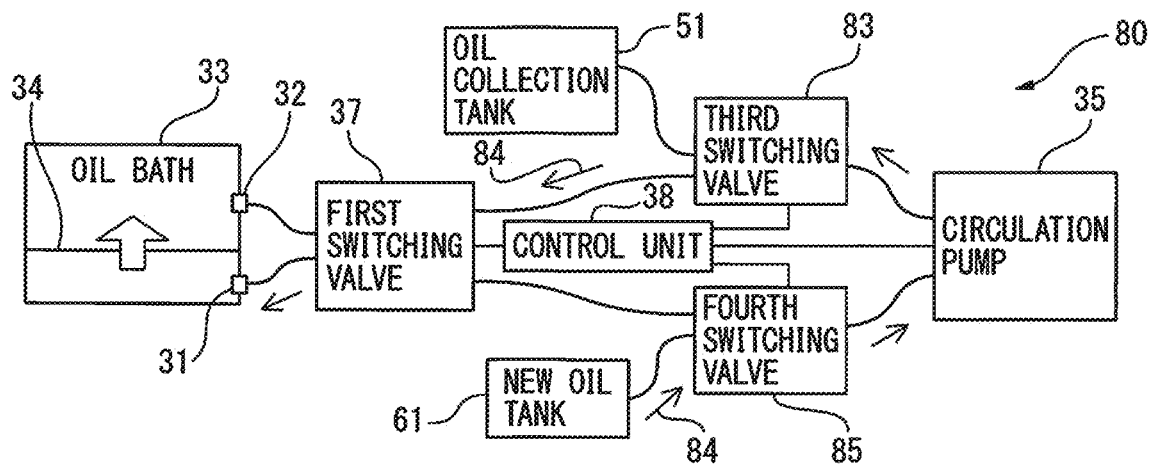
FIG. 4E is a schematic view showing components of the oil circulation device according to the third embodiment in which the agitation mode and the oil exchange mode are combined.

FIGS. 4C to 4E are schematic views showing components of an oil circulation device 80 according to the third embodiment in which the agitation mode and the oil exchange mode are combined. As compared with the oil circulation devices 50 and 60 shown in FIG. 3C and FIG. 3D, the oil circulation device 80 further includes a third switching valve 83, which is located upstream of the oil collection tank 51 so as to switch the path between a path 81 in the agitation mode (see FIG. 4C) and a path 82 in the oil exchange mode (see FIG. 4D), and a fourth switching valve 85, which is located downstream of the new oil tank 61 so as to switch the path between the path 81 in the agitation mode (see FIG. 4C) and an oil supply path 84 in the oil exchange mode (see FIG. 4E).

As shown in FIG. 4C, in the agitation mode, the control unit 38 executes a command for the first switching valve 37 so that the oil supply/discharge direction is switched so as to supply the oil to the first oil supply/discharge port 31 located at the low position, and discharge the oil from the second supply/discharge port 32 located at the high position, and executes a command for the third switching valve 83 and the fourth switching valve 85 so as to switch the path to the path 81 in the agitation mode, and thus, the oil 34 in the oil bath 33 is agitated from the low position to the high position in the oil bath 33 via the circulation pump 35. As a result, impurities in the oil bath 33 can be suspended.

As shown in FIG. 4D, in the collecting operation in the oil exchange mode, after executing the agitation mode so as to suspend impurities the oil bath 33, the control unit 38 executes a command for the first switching valve 37 so that the oil supply/discharge direction is switched so as to discharge the oil 34 from the first oil supply/discharge port 31 located at the low position, and executes a command for the third switching valve 83 so that the path is switched to the collection path 82 in the oil exchange mode, and thus, the oil 34 is collected from the oil bath 33 to the oil collection tank 51 via the circulation pump 35. The collecting operation is performed after the impurities in the oil bath 33 are suspended, and accordingly, the impurities tend not to remain in the oil bath 33, whereby the purification action by oil exchange can be improved.

As shown in FIG. 4E, in the oil supplying operation in the oil exchange mode, after collecting the oil, the control unit 38 executes a command for the first switching valve 37 so that the oil supply/discharge direction is switched so as to supply the oil to the first oil supply/discharge port 31 located at the low position, and executes a command for the third switching valve 83 and the fourth switching valve 85 so that the path is switched to the oil supply path 84 in the oil exchange mode, and thus, the new oil is supplied from the new oil tank 61 to the oil bath 33 via the circulation pump 35. The oil circulation device 80 includes the third switching valve 83 and the fourth switching valve 85, and accordingly, the agitation mode and the oil exchange mode can be automatically switched and executed.

Figure 5:
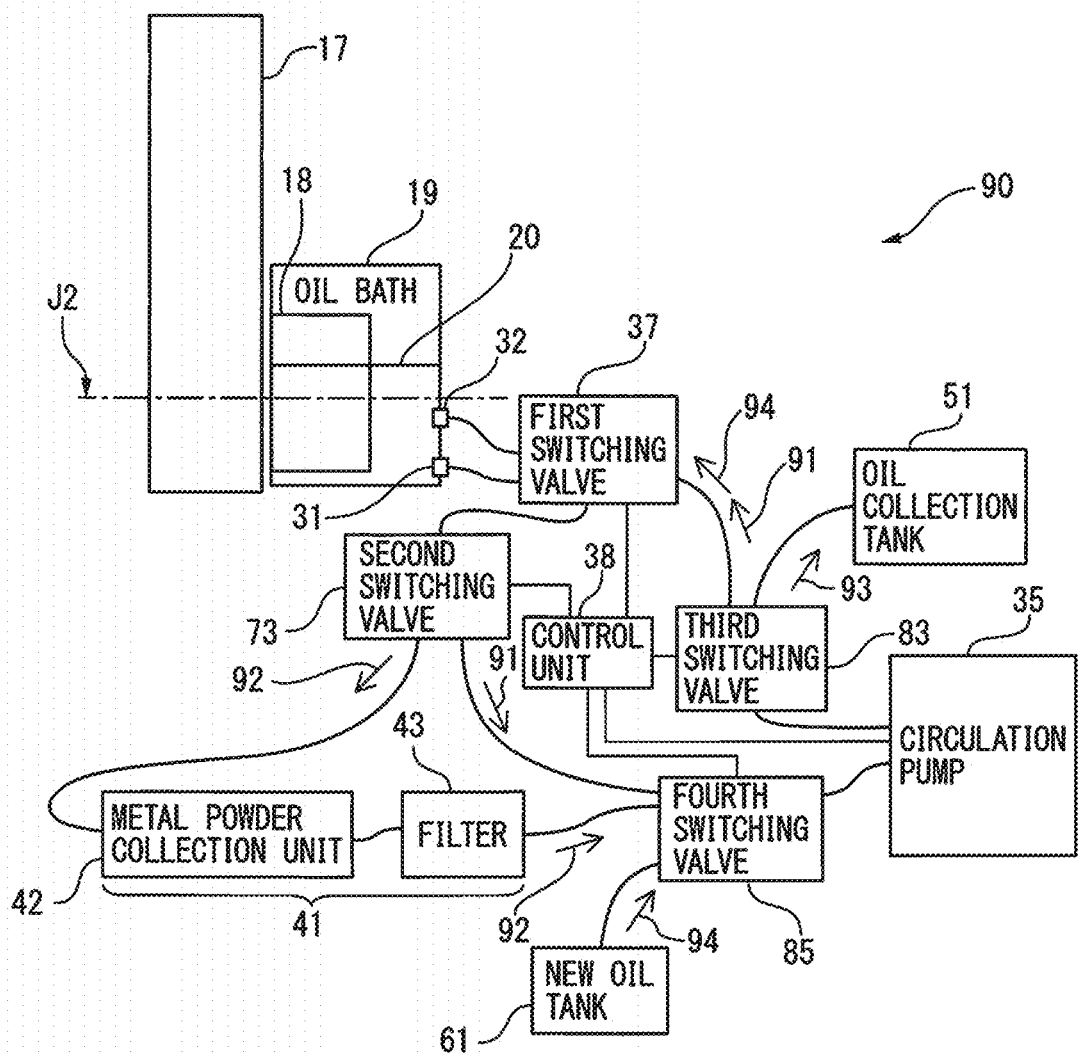
FIG. 5 is a schematic view of an oil circulation device according to a fourth embodiment in which the agitation mode, the filter mode, and the oil exchange mode are combined.

FIG. 5 is a schematic view of an oil circulation device 90 according to a fourth embodiment in which the agitation mode, the filter mode, and the oil exchange mode are combined. The oil bath of the oil circulation device 90 is an oil bath 19 in the second axis J2 of the robot. As compared with the oil circulation device 80 shown in FIGS. 4C to 4E, the oil circulation device 90 further includes a filter mechanism 41 located upstream of the fourth switching valve 85, and a second switching valve 73, which is located upstream of the filter mechanism 41 so as to switching the path between a path 91 in the agitation mode and a path 92 in the filter mode. The filter mechanism 41 is located upstream of the fourth switching valve 85, and thus, impurities tend not to be mixed with the new oil supplied from the new oil tank 61.

In the agitation mode, the control unit 38 executes a command for the first switching valve 37 so that the oil supply/discharge direction is switched so as to supply the oil to the first oil supply/discharge port 31 located at the low position and discharge the oil from the second supply/discharge port 32 located at the high position, and executes a command for the second switching valve 73, the third switching valve 83, and the fourth switching valve 85 so that the path is switched to the path 91 in the agitation mode, and thus, the oil 20 in the oil bath 19 is agitated from a low position to a high position in the oil bath 19 via the circulation pump 35. As a result, impurities in the oil bath 19 can be suspended.

In the filter mode, after executing the agitation mode so as to suspend the impurities in the oil bath 19, the control unit 38 executes a command for the first switching valve 37 so that the oil supply/discharge direction is switched so as to discharge the oil 20 from the first oil supply/discharge port 31 located at the low position and supply the oil to the second oil supply/discharge port 32 located at the high position, and executes a command for the second switching valve 73 and the fourth switching valve 85 so that the path is switched to the path 92 in the filter mode, and thus, the impurities in the oil 20, which has been sent to the filter mechanism 41 by the circulation pump 35, are filtered. The filter mode is executed after the impurities in the oil bath 19 are suspended, and accordingly, the impurities tend not to remain in the oil bath 19, whereby the accuracy of measurement of the metal powder in the impurities can be improved.

In the collection operation in the oil exchange mode, after executing the agitation mode so as to suspend the impurities the oil bath 19, the control unit 38 executes a command for the first switching valve 37 so that the oil supply/discharge direction is switched so as to discharge the oil 20 from the first oil supply/discharge port 31 located at the low position, and executes a command for the third switching valve 83 so that the path is switched to the collection path 93 in the oil exchange mode, and thus, the oil 20 is collected from the oil bath 19 to the oil collection tank 51 via the circulation pump 35. Thus, the impurities tend not to remain in the oil bath 19, whereby the purification action by oil exchange can be improved.

In the oil supplying operation in the oil exchange mode, after executing the collection operation, the control unit 38 executes a command for the first switching valve 37 so that the oil supply/discharge direction is switched so as to supply oil to the first oil supply/discharge port 31 located at the low position, and executes a command for the third switching valve 83 and the fourth switching valve 85 so that the path is switched to the oil supply path 94 in the oil exchange mode, and thus, new oil is supplied from the new oil tank 61 to the oil bath 19 via the circulation pump 35. The oil circulation device 90 includes the second switching valve 73, the third switching valve 83, and the fourth switching valve 85, and thus, the agitation mode, the filter mode, and the oil exchange mode can be automatically switched and executed.

Note that the oil circulation device 90 may further include a separate oil bath 13 having a first oil supply/discharge port 15 and a second oil supply/discharge port 16 on the first axis J1 of the robot shown in FIG. 2A, and a pair of separate pipes (not shown) connected to the separate oil bath 13. In such a case, the first switching valve 37 is further attached to the separate pipes so as to switch the oil flow passage from the oil bath 19 to the separate oil bath 13 and switch the oil supply/discharge direction of each of the first oil supply/discharge port 15 and the second oil supply/discharge port 16.

Figure 6:
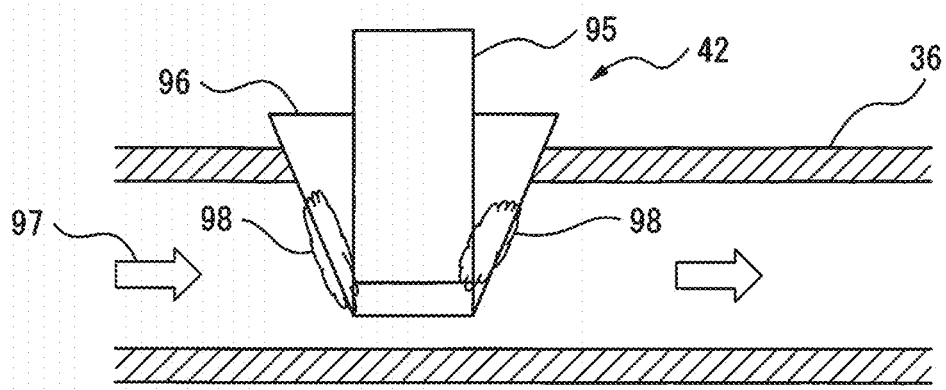
FIG. 6 is an enlarged sectional view showing components of a metal powder collection unit in a filter mechanism.

FIG. 6 is an enlarged sectional view showing components of a metal powder collection unit 42 in the filter mechanism 41. The metal powder collection unit 42 includes a magnet 95 and a resin adapter 96 for covering the magnet 95. The magnet 95 may be an electromagnet to be controlled by the control unit 38. The adapter 96 is inserted into the pipe 36 in a direction orthogonal to the flow direction 97 of the oil. After the metal powder collection unit 42 collects metal powder 98 according to the filter mode described above, the user withdraws the metal powder collection unit from the pipe 36 together with the adapter 96, and further removes the magnet 95 from the adapter 96, and thus, the metal powder 98 falls from the adapter 96. The user can measure the amount, of the metal powder 98 with a predetermined measuring device. The metal powder collection unit 42 is located upstream of the filter 43, and thus, the amount of the metal powder 98 can be measured, and clogging of the filter 43 with the metal powder 98 can be prevented.

Figure 7:
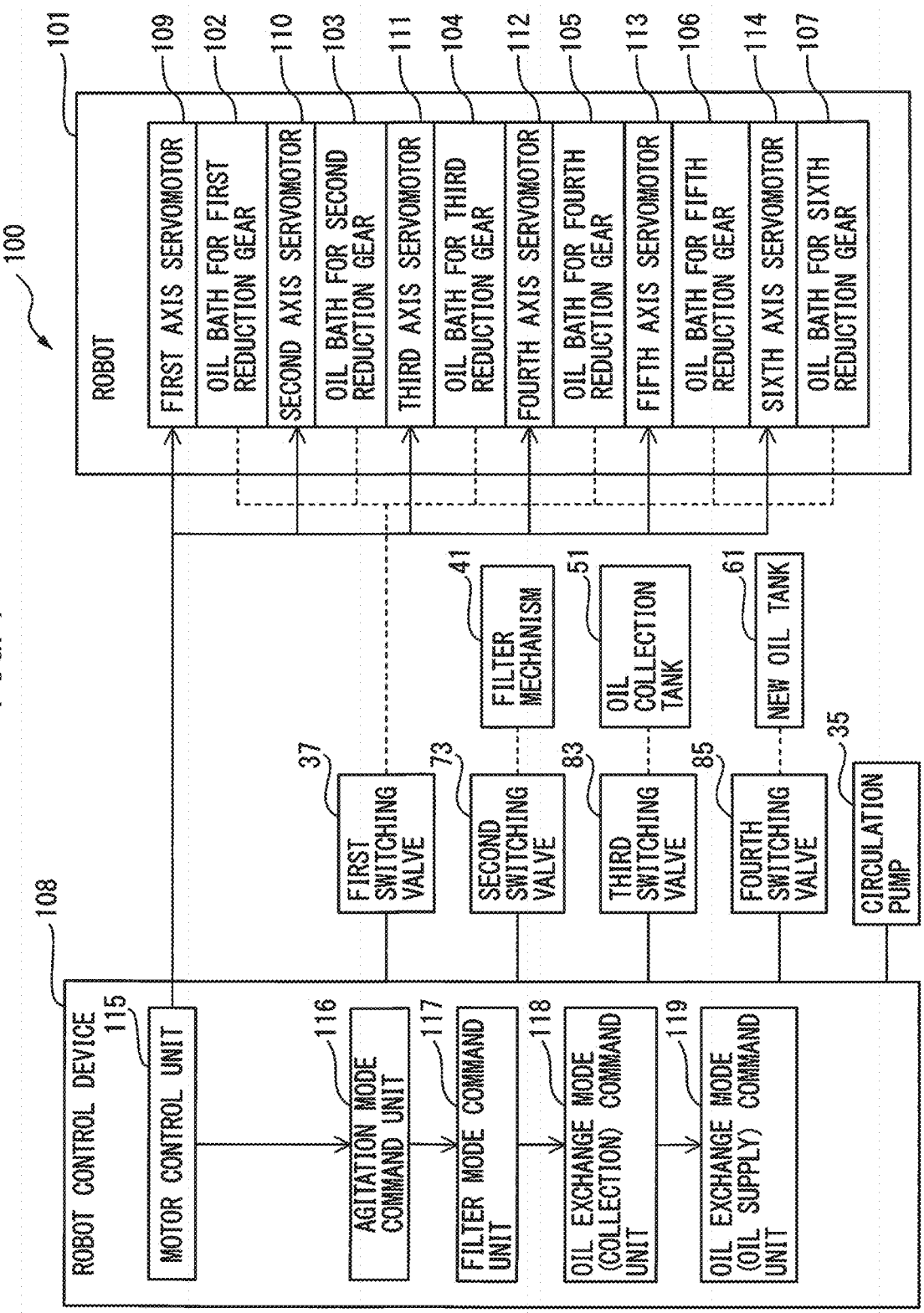
FIG. 7 is a block diagram showing the configuration of an oil circulation system.

FIG. 7 is a block diagram showing the configuration of the oil circulation system 100. The oil circulation system 100 includes an oil circulation device 90 shown in FIG. 5 and a robot 101 having joint axes of a first axis to a sixth axis. The oil baths are oil bathes 102 to 107 for reduction gears, which are respectively arranged on the joint axes of the first axis to the sixth axis. The first switching valve 37 is configured to switch the oil flow passage among the oil baths 102 to 107 for reduction gears. Further, the control unit is a robot control device 108, and the robot control device 108 includes a motor control unit 115 for controlling first-axis to sixth-axis servomotors 109 to 114.

The robot control device 108 further includes an agitation-mode command unit 116 for executing a command for the first switching valve 37, the second switching valve 73, the third switching valve 83, the fourth switching valve 85, and the circulation pump 35 so as to execute the agitation mode, and a filter-mode command unit 117 for executing a command for the first switching valve 37, the second switching valve 73, and the circulation pump 35 so as to execute the filter mode after executing the agitation mode. The robot control device 108 may further include an oil exchange mode (collection) command unit 118 for executing a command for the first switching valve 37, the third switching valve 83, and the circulation pump 35 so as to execute the oil exchange mode (collection) after executing the agitation mode, and an oil exchange mode (oil supply) command unit 119 for executing a command for the first switching valve 37, the third switching valve 83, the fourth switching valve 85, and the circulation pump 35 so as to execute the oil exchange mode (oil supply) after executing the collecting operation.

The robot control device 108 controls the joint axes of the first axis to the sixth axis at predetermined angles, and thus, after the first oil supply/discharge port and the second oil supply/discharge port of each of the oil baths 102 to 107 for the reduction gears are respectively positioned at a low position and a high position, the agitation mode and the filter mode are executed. Alternatively, the robot control device 108 may control the joint axes of the first axis to the sixth axis at predetermined angles, and thus, after the first oil supply/discharge port and the second oil supply/discharge port of each of the oil baths 102 to 107 for the reduction gears are respectively positioned at a low position and a high position, the agitation mode and the oil exchange mode (collection and oil supply) are executed.

Figure 8:
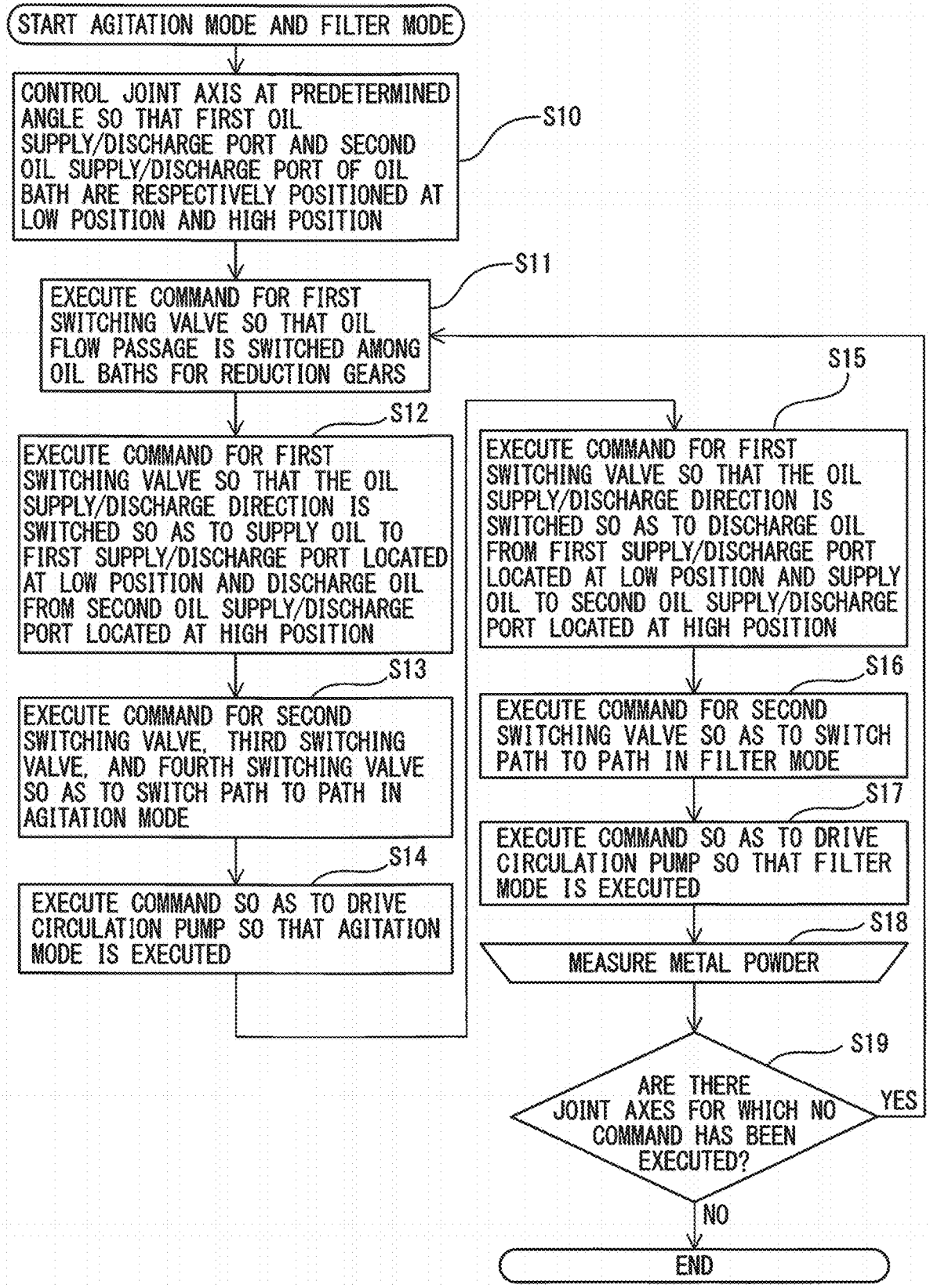
FIG. 8 is a flowchart showing the operation of the oil circulation system in the agitation mode and the filter mode.

FIG. 8 is a flowchart showing the operation of the agitation mode and the filter mode in the oil circulation system 100. Such an operation may be executed by a computer-executable program. First, in step S10, the joint axes, i.e., the first axis to the sixth axis, are controlled at predetermined angles, and thus, the first oil supply/discharge port and the second oil supply/discharge port of each of the oil baths 102 to 107 for the reduction gears are respectively positioned at a low position and a high position in step S11, a command is executed for the first switching valve 37 so as to switch the oil flow passage among the oil baths for reduction gears of the first axis to the sixth axis. In step S12, a command is executed for the first switching valve 37 so that the oil supply/discharge direction is switched so as to supply the oil to the first oil supply/discharge port located at a low position and discharge the oil from the second oil supply/discharge port located at a high position. In step S13, a command is executed for the second switching valve 73, the third switching valve 83, and the fourth switching valve 85 so as to switch the path to the path in the agitation mode. In step S14, a command is executed so as to drive the circulation pump 35, and thus, the agitation mode is executed. As a result, impurities in the oil bath 33 can be suspended.

In step S15, a command is executed for the first switching valve 37 so that the oil supply/discharge direction is switched so as to supply the oil to the first oil supply/discharge port located at the low position and discharge the oil from the second oil supply/discharge port located at the high position. In step S16, a command is executed for the second switching valve 73 so that the path is switched to the path in the filter mode. In step S17, a command is executed so as to drive the circulation pump, and thus, the filter mode is executed. The filter mode is executed after the impurities the oil bath 33 are suspended, and thus, the impurities tend not to remain in the oil bath 33, whereby the accuracy of measurement of the metal powder in the impurities can be improved.

In step S18, the user measures the amount of metal powder and determines the deterioration of the reduction gear or the like. In step S19, it is determined whether there is a joint axis for which no command has been executed. If there is such joint an axis (YES in step S18), the process returns to step S11, and thereafter, a command is executed for the first switching valve 37 so that the oil flow passage is switched to a separate oil bath for reduction gear. Subsequently, in steps S12 to S17, the agitation mode and the filter mode are executed. In step S18, if there are no joint axes for which no command has been executed (NO in step S18), the operation ends.

Figure 9:
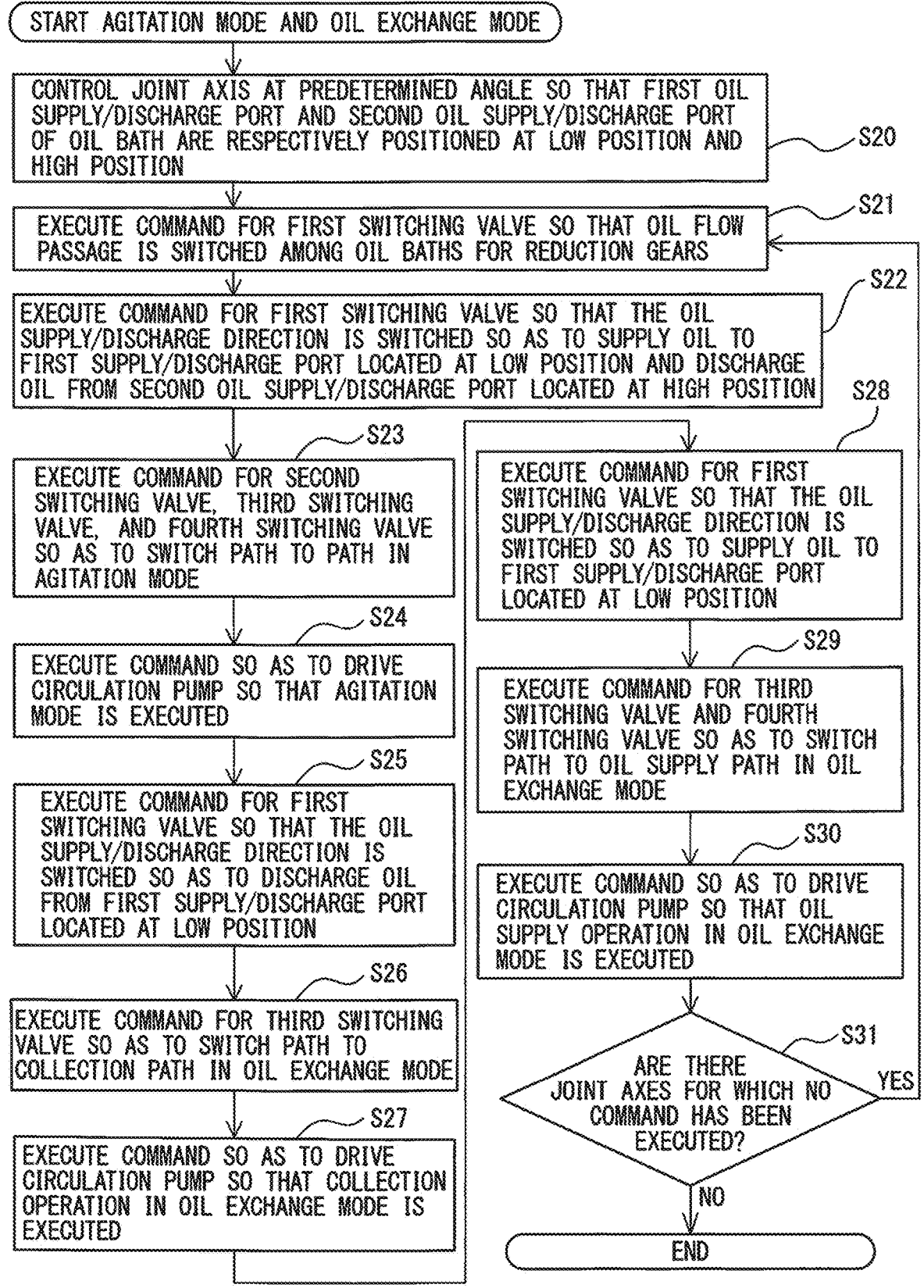
FIG. 9 is a flowchart showing the operation of the oil circulation system in the agitation mode and the filter mode.

FIG. 9 is a flowchart showing the operation in the agitation mode and the oil exchange mode in the oil circulation system 100. Such an operation may be executed by a computer-executable program. First, in step S20, the joint axes, i.e., the first axis to the sixth axis are controlled at predetermined angles, and thus, the first oil supply/discharge port and the second oil supply/discharge port of each of the oil baths 102 to 107 for the reduction gears are respectively positioned at a low position and a high position. In step S21, a command is executed for the first switching valve 37 so as to switch the oil flow passage among the oil baths for the reduction gears of the first axis to the sixth axis. In step S22, a command is executed for the first switching valve 37 so that the oil supply/discharge direction is switched so as to supply the oil to the first oil supply/discharge port located at the low position and discharge the oil from the second oil supply/discharge port located at the high position. In step S23, a command is executed for the second switching valve 73, the third switching valve 83, and the fourth switching valve 85 so as to switch the path to the path in the agitation mode. In step S24, a command is executed so as to drive the circulation pump 35, and thus, the agitation mode is executed. As a result, impurities in the oil bath 33 can be suspended.

In step S25, a command is executed for the first switching valve 37 so that the oil supply/discharge direction is switched so as to discharge the oil from the first oil supply/discharge port located at the low position and supply the oil to the second oil supply/discharge port located at the high position. In step S26, a command is executed for the third switching valve 83 so that the path is switched to the path in the oil exchange mode. In step S27, a command is executed so as to drive the circulation pump, and thus, a collecting operation in the oil exchange mode is executed. The collecting operation is executed after impurities in the oil bath 33 are suspended, and thus, the impurities tend not to remain in the oil bath 33, whereby the purification action by oil exchange can be improved.

In step S28, a command is executed for the first switching valve 37 so that the oil supply/discharge direction is switched so as to supply the oil to the first oil supply/discharge port located at the low position. In step S29, a command is executed for the third switching valve 83 and the fourth switching valve 85 so that the path is switched to the path in the oil exchange mode. In step S30, a command is executed so as to drive the circulation pump, and thus, an oil supply operation in the oil exchange mode is executed.

In step S31, it is determined whether there is a joint axis for which no command has been executed. If there is such a joint axis (YES in step S31), the process returns to step S21, and thereafter, a command is executed for the first switching valve 37 so that the oil flow passage is switched to a separate oil bath for reduction gear. Subsequently, in steps S22 to S30, the agitation mode and the oil exchange mode are executed. In step S31, if there are no joint axes for which no command has been executed (NO in step S31), the process ends.

According to the oil circulation system 100 described above, it is possible to continuously measure the metal powder in the impurities or exchange the oil while automatically switching the oil baths for the reduction gears for the first axis to the sixth axis.

The computer executable program in the embodiment described above can be recorded and provided in a computer readable non-transitory recording medium such as a CD-ROM. Various embodiments have been described in this specification. However, the present invention is not limited to the above-described various embodiments and various modifications can be made within the scope of the features described in the following claims.

The invention claimed is:

1. An oil circulation device for agitating oil, comprising:
an oil bath having a first oil supply/discharge port and a second oil supply/discharge port;
a circulation pump for circulating the oil;
a pair of pipes for connecting the oil bath and the circulation pump;
an oil supply/discharge direction switching valve which is attached to the pipes so as to switch the oil supply/discharge direction for the first oil supply/discharge port and the second oil supply/discharge port;
a filter mechanism which is located upstream of the circulation pump so as to filter impurities in the oil; and
a control unit for controlling at least the circulation pump and the oil supply/discharge direction switching valve, wherein
the control unit has:
an agitation mode in which a command is executed for the oil supply/discharge direction switching valve so that the oil supply/discharge direction is switched so as to supply oil to the first oil supply/discharge port located at a low position in the oil bath and discharge oil from the second oil supply/discharge port located at a high position in the oil bath, whereby oil in the oil bath is agitated via the circulation pump from the low position to the high position in the oil bath; and
a filter mode in which, after the agitation mode is executed so as to suspend impurities in the oil bath, a command is executed for the oil supply/discharge direction switching valve so that the oil supply/discharge direction is switched so as to discharge oil from the first oil supply/discharge port located at the low position in the oil bath and supply oil to the second oil supply/discharge port located at the high position in the oil bath, whereby impurities in the oil sent to the filter mechanism by the circulation pump are filtered.

2. The oil circulation device according to claim 1, further comprising: an oil collection tank located downstream of the circulation pump; and a new oil tank located upstream of the circulation pump, wherein
the control unit further has:
an oil exchange mode in which, after the agitation mode is executed so as to suspend impurities in the oil bath, a command is executed for the oil supply/discharge direction switching valve so that the oil supply/discharge direction is switched so as to discharge oil from the first oil supply/discharge port located at the low position in the oil bath, whereby the oil is collected from the oil bath to the oil collection tank via the circulation pump, and a command is executed for the oil supply/discharge direction switching valve so that the oil supply/discharge direction is switched so as to supply oil to the first oil supply/discharge port located at the low position in the oil bath, whereby new oil is supplied from the new oil tank to the oil bath via the circulation pump.

3. The oil circulation device according to claim 2, further comprising:
an oil collection path switching valve which is located upstream of the oil collection tank so as to switch the path between a path in the agitation mode and a collection path in the oil exchange mode; and
an oil supply path switching valve which is located downstream of the new oil tank so as to switch the path between a path in the agitation mode and an oil supply path in the oil exchange mode.

4. An oil circulation system, comprising:
the oil circulation device according to claim 2; and
a robot having a plurality of joint axes,
wherein the oil bath is an oil bath for a reduction gear located for each of the plurality of joint axes,
wherein the oil supply/discharge direction switching valve is further configured to switch the oil flow passage among the oil baths for the reduction gears, and
wherein the control unit is a robot control device, and the robot control device controls the joint axes at predetermined angles, whereby the first oil supply/discharge port and the second oil supply/discharge port of each of the oil baths for the reduction gears are respectively positioned at the low position and the high position in said each of the oil baths, and, after a command is executed for the oil supply/discharge direction switching valve so as to switch the oil flow passage among the oil baths for the reduction gears, the agitation mode and the oil exchange mode are executed.

5. The oil circulation device according to claim 1, wherein components of the oil circulation device are provided as a composable kit, and are individually removable.

6. The oil circulation device according to claim 1, further comprising:
   a separate oil bath having a first oil supply/discharge port and a second oil supply/discharge port; and
   a pair of separate pipes connected to the separate oil bath, wherein the oil supply/discharge direction switching valve is further attached to the separate pipes so as to switch the oil flow passage from the oil bath to the separate oil bath and switch the oil supply/discharge direction for each of the first oil supply/discharge port and the second oil supply/discharge port.

7. The oil circulation device according to claim 1, further comprising a filter path switching valve which is located upstream of the filter mechanism so as to switch the path between an agitation path in the agitation mode and a filter path in the filter mode.

8. The oil circulation device according to claim 1, wherein the impurities include metal powder and sludge, and the filter mechanism comprises a metal powder collection unit for collecting the metal powder in the oil, and a filter for filtering the sludge in the oil.

9. An oil circulation system, comprising:
   the oil circulation device according to claim 1; and
   a robot having a plurality of joint axes,
      wherein the oil bath is an oil bath for a reduction gear located for each of the plurality of joint axes,
      wherein the oil supply/discharge direction switching valve is further configured to switch the oil flow passage among the oil baths for the reduction gears, and
      wherein the control unit is a robot control device, and the robot control device controls the joint axes at predetermined angles, whereby the first oil supply/discharge port and the second oil supply/discharge port of each of the oil baths for the reduction gears are respectively positioned at the low position and the high position in said each of the oil baths, and, after a command is executed for the oil supply/discharge direction switching valve so as to switch the oil flow passage among the oil baths for the reduction gears, the agitation mode and the filter mode are executed.

10. An oil circulation device for agitating oil, comprising:
an oil bath having a first oil supply/discharge port and a second oil supply/discharge port;
a circulation pump for circulating the oil;
a pair of pipes for connecting the oil bath and the circulation pump;
an oil supply/discharge direction switching valve which is attached to the pipes so as to switch the oil supply/discharge direction for each of the first oil supply/discharge port and the second oil supply/discharge port;
an oil collection tank which is located downstream of the circulation pump so as to collect oil;
a new oil tank which is located upstream of the circulation pump so as to receive new oil; and
a control unit for controlling at least the circulation pump and the oil supply/discharge direction switching valve,
wherein
the control unit has:
   an agitation mode in which a command is executed for the oil supply/discharge direction switching valve so that the oil supply/discharge direction is switched so as to supply oil to the first oil supply/discharge port located at a low position in the oil bath and discharge oil from the second oil supply/discharge port located at a high position in the oil bath, whereby oil in the oil bath is agitated via the circulation pump from the low position to the high position in the oil bath; and
   an oil exchange mode in which, after the agitation mode is executed so as to suspend impurities in the oil bath, a command is executed for the oil supply/discharge direction switching valve so that the oil supply/discharge direction is switched so as to discharge oil from the first oil supply/discharge port located at the low position in the oil bath, whereby the oil is collected from the oil bath to the oil collection tank via the circulation pump, and a command is executed for the oil supply/discharge direction switching valve so that the oil supply/discharge direction is switched so as to supply oil to the first oil supply/discharge port located at the low position in the oil bath, whereby the new oil is supplied from the new oil tank to the oil bath via the circulation pump.

* * * * *